United States Patent
Ünsal et al.

(10) Patent No.: US 9,162,220 B2
(45) Date of Patent: Oct. 20, 2015

(54) CATALYST SUPPORT MATERIAL COMPRISING POLYAZOLE, ELECTROCHEMICAL CATALYST, AND THE PREPARATION OF A GAS DIFFUSION ELECTRODE AND A MEMBRANE-ELECTRODE ASSEMBLY THEREFROM

(75) Inventors: Ömer Ünsal, Mainz (DE); Sigmar Bräuninger, Hemsbach (DE); Claudia Querner, Ludwigshafen (DE); Ekkehard Schwab, Neustadt (DE)

(73) Assignee: BASF SE, Ludwigshafen (DE)

( * ) Notice: Subject to any disclaimer, the term of this patent is extended or adjusted under 35 U.S.C. 154(b) by 113 days.

(21) Appl. No.: 13/278,792

(22) Filed: Oct. 21, 2011

(65) Prior Publication Data
US 2012/0100457 A1 Apr. 26, 2012

Related U.S. Application Data

(60) Provisional application No. 61/405,243, filed on Oct. 21, 2010.

(51) Int. Cl.
| | | |
|---|---|---|
| H01M 4/86 | (2006.01) | |
| B01J 31/06 | (2006.01) | |
| H01M 8/10 | (2006.01) | |
| H01M 4/88 | (2006.01) | |
| H01M 4/92 | (2006.01) | |

(52) U.S. Cl.
CPC .......... *B01J 31/06* (2013.01); *H01M 4/86* (2013.01); *H01M 4/8817* (2013.01); *H01M 4/8842* (2013.01); *H01M 4/92* (2013.01); *H01M 8/10* (2013.01); *Y02E 60/50* (2013.01)

(58) Field of Classification Search
CPC ........................................................ H01M 4/86
USPC .................... 429/480, 482, 428, 528
See application file for complete search history.

(56) References Cited

U.S. PATENT DOCUMENTS

| | | | |
|---|---|---|---|
| 6,902,801 B2 * | 6/2005 | Charnock et al. .......... 428/320.2 |
| 2005/0053820 A1 * | 3/2005 | Calundann et al. ............. 429/33 |
| 2005/0067345 A1 * | 3/2005 | Prugh et al. .............. 210/500.27 |
| 2008/0187807 A1 * | 8/2008 | Schmidt et al. ................. 429/30 |
| 2010/0252782 A1 * | 10/2010 | Masahiro ..................... 252/511 |
| 2011/0081591 A1 | 4/2011 | Scherer et al. |
| 2011/0217620 A1 | 9/2011 | Braeuninger et al. |
| 2011/0262835 A1 | 10/2011 | Ünsal et al. |
| 2011/0318661 A1 | 12/2011 | Uensal et al. |

FOREIGN PATENT DOCUMENTS

| | | | |
|---|---|---|---|
| CN | 1510776 A | | 7/2004 |
| CN | 1667407 A | | 9/2005 |
| DE | 10 2004 063 457 A1 | | 7/2006 |
| WO | WO 97/20358 A1 | | 6/1997 |
| WO | WO 2006/005466 A1 | | 1/2006 |
| WO | WO 2007/061248 | * | 5/2007 |
| WO | WO 2009/146924 A1 | | 12/2009 |
| WO | WO 2010/099948 A1 | | 9/2010 |
| WO | WO 2010/145828 A2 | | 12/2010 |
| WO | WO 2011/020560 A1 | | 2/2011 |
| WO | WO 2011/036165 A1 | | 3/2011 |
| WO | WO 2011/042158 A1 | | 4/2011 |

OTHER PUBLICATIONS

U.S. Appl. No. 13/497,626, filed Mar. 22, 2012, Querner, et al.
International Search Report and Written Opinion issued Mar. 15, 2012 in Corresponding PCT/182011/054668 Filed on Oct. 19, 2011.
F. Seland, et al., "Improving the performance of high-temperature PEM fuel cells based on PBI electrolyte", Journal of Power Sources, vol. 160, 2006, pp. 27-36.
O.E. Kongstein, et al., "Polymer electrolyte fuel cells based on phosphoric acid doped polybenzimidazole (PBI) membranes", Energy, vol. 32, 2007, pp. 418-422.
U.S. Appl. No. 13/375,805, filed Dec. 2, 2011, Schwab, et al.
U.S. Appl. No. 13/380,194, filed Dec. 22, 2011, Uensal, et al.
U.S. Appl. No. 13/388,803, filed Feb. 3, 2012, Querner, et al.
U.S. Appl. No. 13/377,346, filed Dec. 9, 2011, Belack, et al.
U.S. Appl. No. 13/278,830, filed Oct. 21, 2011, Uensal, et al.
U.S. Appl. No. 13/391,543, filed Feb. 21, 2012, Uensal, et al.

* cited by examiner

*Primary Examiner* — Patrick Ryan
*Assistant Examiner* — Alex Usyatinsky
(74) *Attorney, Agent, or Firm* — Oblon, McClelland, Maier & Neustadt, L.L.P.

(57) ABSTRACT

A process for preparing a catalyst material comprising an electrically conducting support material, a proton-conducting, polyazole-based polymer and a catalytically active material. A catalyst material prepared by the process of the invention. A catalyst ink comprising a catalyst material of the invention and a solvent. A catalyst-coated membrane (CCM) comprising a polymer electrolyte membrane and also catalytically active layers comprising a catalyst material of the present invention. A gas diffusion electrode (GDE) comprising a gas diffusion layer and a catalytically active layer comprising a catalyst material of the invention. A membrane-electrode assembly (MEA) comprising a polymer electrolyte membrane, catalytically active layers comprising a catalyst material of the invention, and gas diffusion layers. And a fuel cell comprising a membrane-electrode assembly of the present invention.

20 Claims, No Drawings

CATALYST SUPPORT MATERIAL COMPRISING POLYAZOLE, ELECTROCHEMICAL CATALYST, AND THE PREPARATION OF A GAS DIFFUSION ELECTRODE AND A MEMBRANE-ELECTRODE ASSEMBLY THEREFROM

The present invention relates to a process for preparing a catalyst material comprising at least one electrically conducting support material, at least one proton-conducting, polyazole-based polymer and at least one catalytically active material, to a catalyst material preparable by the process of the invention, to a catalyst ink comprising at least one catalyst material of the invention and at least one solvent, to a catalyst-coated membrane (CCM) comprising a polymer electrolyte membrane and also catalytically active layers comprising at least one catalyst material of the present invention, to a gas diffusion electrode (GDE) comprising a gas diffusion layer and a catalytically active layer comprising at least one catalyst material of the invention, to a membrane-electrode assembly (MEA) comprising a polymer electrolyte membrane, catalytically active layers comprising at least one catalyst material of the invention, and gas diffusion layers, and to a fuel cell comprising at least one membrane-electrode assembly of the present invention.

Proton-conducting, i.e., acid-doped, polyazole membranes for use in PEM fuel cells are already known in the prior art. The basic polyazole films are doped generally with concentrated sulfuric acid or phosphoric acid and then act as proton conductors and separators in what are called polymer electrolyte membrane fuel cells (PEM fuel cells). By virtue of the outstanding properties of the polyazole polymer, polymer electrolyte membranes of this kind can be processed to membrane-electrode assemblies (MEAs) and used in fuel cells at long-term operating temperatures of more than 100° C., more particularly more than 120° C. These high long-term operating temperatures allow the activity of the noble-metal-based catalysts present in the membrane-electrode assembly to be increased. Especially where so-called reformates of hydrocarbons are used, significantly higher quantities of carbon monoxide are present in the reformer gas, and must usually be removed by costly and inconvenient gas processing or gas purification. The possibility of raising the operating temperature allows significantly higher concentrations of carbon monoxide impurities to be tolerated on a long-term basis.

Through the use of polymer electrolyte membranes based on polyazole polymers it is possible on the one hand to forego in some cases the costly and inconvenient gas processing or gas purification, and on the other hand to reduce the catalyst loading in the membrane-electrode assembly. Both factors are a vital prerequisite for mass deployment of PEM fuel cells, since otherwise the costs of a PEM fuel cell system are too high.

A critical factor for the performance and also the long-term stability of a membrane-electrode assembly comprising an acid-doped, proton-conducting polyazole membrane is the amount of acid present in the catalyst layer of the membrane-electrode assembly. The catalyst layer from which the electrode of the membrane-electrode assembly is constructed frequently comprises a nonpolar polymer such as polytetrafluoroethylene (PTFE), and so the amount of acid in the catalyst layer is low and in long-term operation, owing to the hydrophobizing property of the catalyst layer, can lead to problems.

In the prior art, therefore, membrane-electrode assemblies and also catalyst layers are described in which the amount of acid in the catalyst layer is increased and can be maintained in operation of the fuel cell.

Accordingly, DE 10 2004 063 457 A1 relates to a membrane-electrode assembly having a fuel cell membrane which is disposed between two gas diffusion layers, the fuel cell membrane being formed on the basis of an acid-impregnated polymer; between the fuel cell membrane and the gas diffusion layers in each case there is disposed at least one catalyst-containing layer with an addition of polymer, the disposition being such that water is held and/or acid is stored in the membrane-electrode assembly and/or in the fuel cell membrane. The polymer addition to the catalyst-containing layer in this case is selected from the group of polyazoles, more particularly at least one component from the group of polybenzimidazoles, poly(pyridine), polybenzoxazole or mixtures thereof. The preparation of the catalyst layer and of electrodes which comprise this catalyst layer is accomplished by adding a solvent, a pore-forming material, and a polymer solution to at least one catalyst material preferably in powder form, and processing the mixture to form an electrode paste in a substantially homogeneous mixed state. By means of screen printing, the catalyst material present in the electrode paste is applied to the gas diffusion layer of a membrane-electrode assembly.

WO 2006/005466 relates to gas diffusion electrodes having a plurality of gas-permeable, electrically conductive layers constructed at least from a gas diffusion layer and a catalyst layer, the catalyst layer containing at least particles of an electrically conductive support material, and at least some of the particles carrying an electrocatalyst and/or being at least partly loaded with at least one porous, proton-conducting polymer, this proton-conducting polymer being suitable for use at temperatures up to above the boiling point of water. The loading with the proton-conducting polymer and formation of the porous structure take place, according to WO 2006/005466, by means of the phase inversion method. This method includes the step of providing at least one particulate, electrically conductive support material for the catalyst layer, where at least some of the particles carry an electrocatalyst and/or are at least partly loaded with at least the porous, proton-conducting polymer. According to the examples in WO 2006/005466, particles of an electrically conductive support material for the catalyst layer that are loaded with at least one porous, proton-conducting polymer are prepared by adding a suspension of catalyst carbon black to a solution of polybenzimidazole. The catalyst carbon black is loaded with 20% of platinum.

S. Seland et al., Journal of Power Sources 160 (2006) 27 to 36, disclose the improvement in the performance of high-temperature PEM fuel cells based on polybenzimidazole electrolytes. In order to determine the optimum structures for anodes and cathodes and for the platinum content in electrodes suitable for PEM fuel cells, variations were made not only in the platinum content of the Pt/C catalyst used and in the catalyst loading but also in the loading with the polybenzimidazole electrolyte in dispersion in the catalyst layer. To obtain a catalyst layer in which polybenzimidazole is dispersed in the catalyst layer, polybenzimidazole is dissolved in dimethylacetamide, and the catalyst particles (Pt/C) are dispersed in this solution.

O. E. Kongstein et al., Energy 32 (2007) 418 to 422, relates to polymer electrolyte fuel cells based on polybenzimidazole membranes which are doped with phosphoric acid. The most suitable electrodes are obtained according to O. E. Kongstein et al. by spraying a dispersion of a catalyst into a solution of polybenzimidazole in dimethylacetamide.

A feature common to all of the above-cited processes for preparing a catalyst layer for use in polymer electrolyte membrane fuel cells is that the finished catalyst comprising Pt on carbon black is treated with a solution of polybenzimidazole. This means that polybenzimidazole polymer is deposited on the Pt/C catalyst. In such an operation, however, the risk exists that the catalytically active area will be covered with polymer and the activity of the catalyst will be lowered as a result.

It is therefore an object of the present invention, in the light of the prior art, to provide a catalyst material which allows good access of the reaction components to the catalytically active species, for example Pt, so that the catalyst material has a high activity.

A further object of the present invention is to improve the following points in polymer electrolyte membrane fuel cells based on polyazole:

(i) increasing the three-phase boundary between catalyst, ionomer, and gas;
(ii) more effectively and homogeneously distributing the acid in the catalyst layer than in the fuel cells and membrane-electrode assemblies of the prior art;
(iii) reducing or avoiding the loss of acid during cell operation;
(iv) increasing the long-term stability.

This object is achieved by means of a process for preparing a catalyst material comprising
(a) at least one electrically conductive support material,
(b) at least one proton-conducting polyazole-based polymer,
(c) at least one catalytically active material which comprises the steps:
(i) contacting of the at least one electrically conductive support material with the at least one proton-conducting polyazole-based polymer,
(ii) application of at least one precursor compound of the at least one catalytically active material or application of the at least one catalytically active material itself to the support material obtained according to step (i),
(iii) if at least one precursor compound of the at least one catalytically active material is applied in step (ii), conversion of the at least one precursor compound into the at least one catalytically active material by reduction.

By means of the process of the invention it is possible to achieve better utilization of the catalyst surface area through an increase in the three-phase boundary and also to achieve an improvement in the long-term stability of membrane-electrode assemblies and fuel cells which comprise the catalyst material prepared in accordance with the invention.

Electrically Conductive Support Material

As electrically conductive support material it is possible in principle to use any electrically conductive support material known to the skilled person. Electrically conductive support material preferably comprises a carbon-containing support material, preferably selected from carbon black, graphite, carbon fibers, activated carbon, carbon nanomers (nanotypes), and carbon foams. It is especially preferred to use carbon black.

The average particle size of the primary particles of the electrically conductive support material, preferably carbon black, is generally 10 to 300 nm, preferably 10 to 200 nm, more preferably 10 to 150 nm.

Proton-Conducting, Polyazole-Based Polymer

The term "proton-conducting polymers" is to be understood, in the sense of the present specification, to refer to those polymers which are proton-conductive per se or capable of proton conduction, for example, through absorption of a dopant, e.g., a strong organic or inorganic acid. Suitable organic or inorganic acids are phosphoric acid or sulfuric acid, with phosphoric acid being particularly preferred.

Polyazoles used with preference are polyazoles which contain repeating azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII):

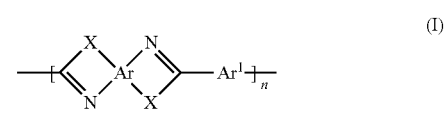

(I)

(II)

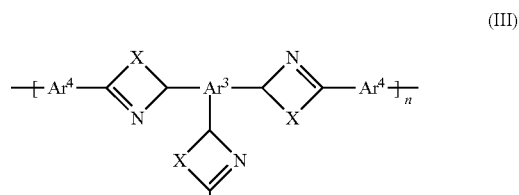

(III)

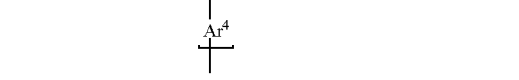

(IV)

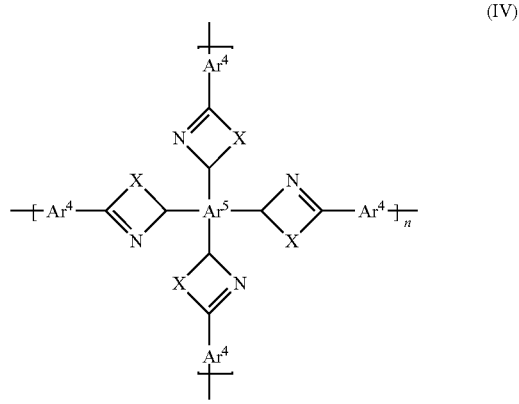

(V)

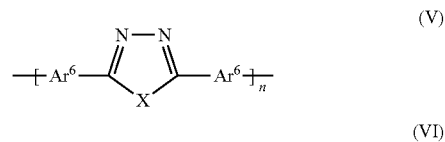

(VI)

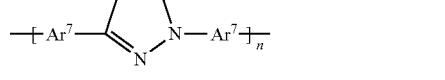

(VII)

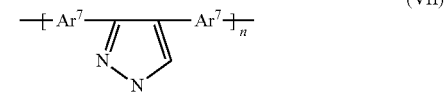

(VIII)

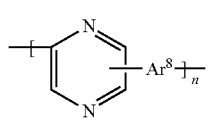

-continued

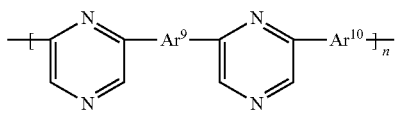 (IX)

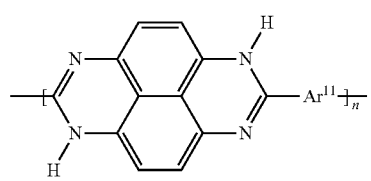 (X)

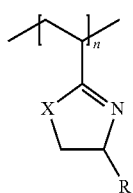 (XI)

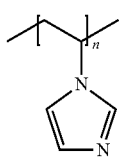 (XII)

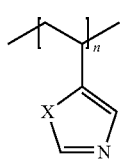 (XIII)

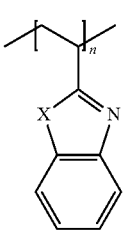 (XIV)

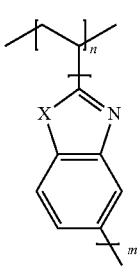 (XV)

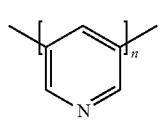 (XVI)

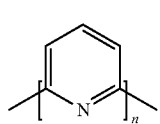 (XVII)

-continued

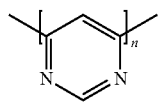 (XVIII)

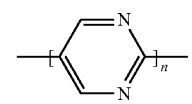 (XIX)

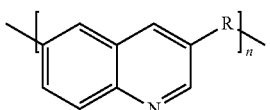 (XX)

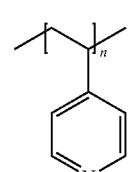 (XXI)

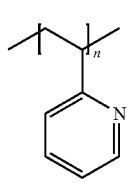 (XXII)

in which

Ar are identical or different and are a tetravalent aromatic or heteroaromatic group which may be monocyclic or polycyclic, $Ar^1$ are identical or different and are a divalent aromatic or heteroaromatic group which may be monocyclic or polycyclic, $Ar^2$ are identical or different and are a divalent or trivalent aromatic or heteroaromatic group which may be monocyclic or polycyclic, $Ar^3$ are identical or different and are a trivalent aromatic or heteroaromatic group which may be monocyclic or polycyclic, $Ar^4$ are identical or different and are a trivalent aromatic or heteroaromatic group which may be monocyclic or polycyclic, $Ar^5$ are identical or different and are a tetravalent aromatic or heteroaromatic group which may be monocyclic or polycyclic, $Ar^6$ are identical or different and are a divalent aromatic or heteroaromatic group which may be monocyclic or polycyclic, $Ar^7$ are identical or different and are a divalent aromatic or heteroaromatic group which may be monocyclic or polycyclic, $Ar^8$ are identical or different and are a trivalent aromatic or heteroaromatic group which may be monocyclic or polycyclic, $Ar^9$ are identical or different and are a divalent or trivalent or tetravalent aromatic or heteroaromatic group which may be monocyclic or polycyclic, $Ar^{10}$ are identical or different and are a divalent or trivalent aromatic or heteroaromatic group which may be monocyclic or polycyclic, $Ar^{11}$ are identical or different and are a divalent aromatic or heteroaromatic group which may be monocyclic or polycyclic, X is identical or different and is oxygen, sulfur or an amino group which carries a hydrogen atom, a group having 1 to 20 carbon atoms, preferably a branched or unbranched alkyl or alkoxy group, or an aryl group as further radical, R is identical or different and is hydrogen, an alkyl group or an aromatic group and, in formula (XX), is an alkylene group or an aromatic group, with the proviso that R in formula (XX) is other than hydrogen, and n, m is an integer≥10, preferably ≥100.

Preferred aromatic or heteroaromatic groups derive from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrrole, pyrazole, anthracene, benzopyrrole, benzotriazole, benzooxathiadiazole, benzooxadiazole, benzopyridine, benzopyrazine, benzopyrazidine, benzopyrimidine, benzotriazine, indolizine, quinolizine, pyridopyridine, imidazolepyrimidine, pyrazinopyrimidine, carbazole, azeridine, phenazine, benzoquinoline, phenoxazine, phenothiazine, aziridizine, benzopteridine, phenanthroline, and phenanthrene, which optionally may also be substituted.

The substitution pattern of $Ar^1$, $Ar^4$, $Ar^6$, $Ar^7$, $Ar^8$, $Ar^9$, $Ar^{10}$, and $Ar^{11}$ is arbitrary; in the case of phenylene, for example, $Ar^1$, $Ar^4$, $Ar^6$, $Ar^7$, $Ar^8$, $Ar^9$, $Ar^{10}$, and $Ar^{11}$ may independently of one another be ortho-, meta-, and para-phenylene. Particularly preferred groups derive from benzene and biphenylene, which optionally may be substituted.

Preferred alkyl groups are alkyl groups having 1 to 4 carbon atoms, e.g., methyl, ethyl, n-propyl, isopropyl, and tert-butyl groups.

Preferred aromatic groups are phenyl or naphthyl groups. The alkyl groups and the aromatic groups may be substituted one or more times.

Preferred substituents are halogen atoms, e.g., fluorine, amino groups, hydroxyl groups or $C_1$-$C_4$ alkyl groups, e.g., methyl or ethyl groups.

The polyazoles may in principle have different repeating units which differ, for example, in their radical X. Preferably, however, the respective polyazoles have exclusively identical radicals X in a repeating unit.

In one particularly preferred embodiment of the present invention, the polyazole has repeating azole units of the formula (I) and/or (II).

In one embodiment, the polyazoles used are polyazoles comprising repeating azole units in the form of a copolymer or of a blend which comprises at least two units of the formula (I) to (XXII) that differ from one another. The polymers may be present in the form of block copolymers (diblock, triblock), random copolymers, periodic copolymers and/or alternating polymers.

The number of repeating azole units in the polymer is preferably an integer≥10, more preferably ≥100.

In a further preferred embodiment, polyazoles used are polyazoles which comprise repeating units of the formula (I) in which the radicals X are identical within the repeating units.

Further preferred polyazoles are selected from the group consisting of polybenzimidazole, poly(pyridine), poly(pyrimidine), polyimidazole, polybenzothiazole, polybenzoxazole, polyoxadiazole, polyquinoxaline, polythiadiazole, and poly(tetrazapyrene).

In one particularly preferred embodiment, polyazoles used were those which comprise repeating benzimidazole units. Recited below are suitable polyazoles which have repeating benzimidazole units:

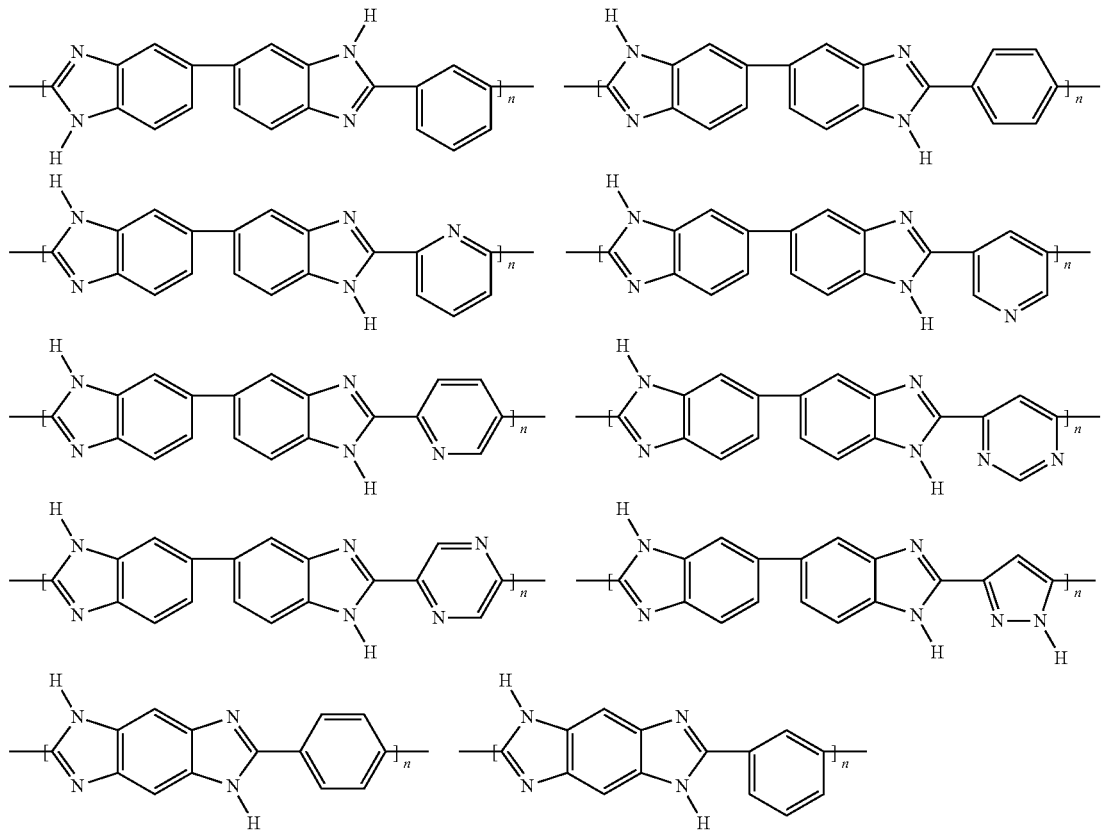

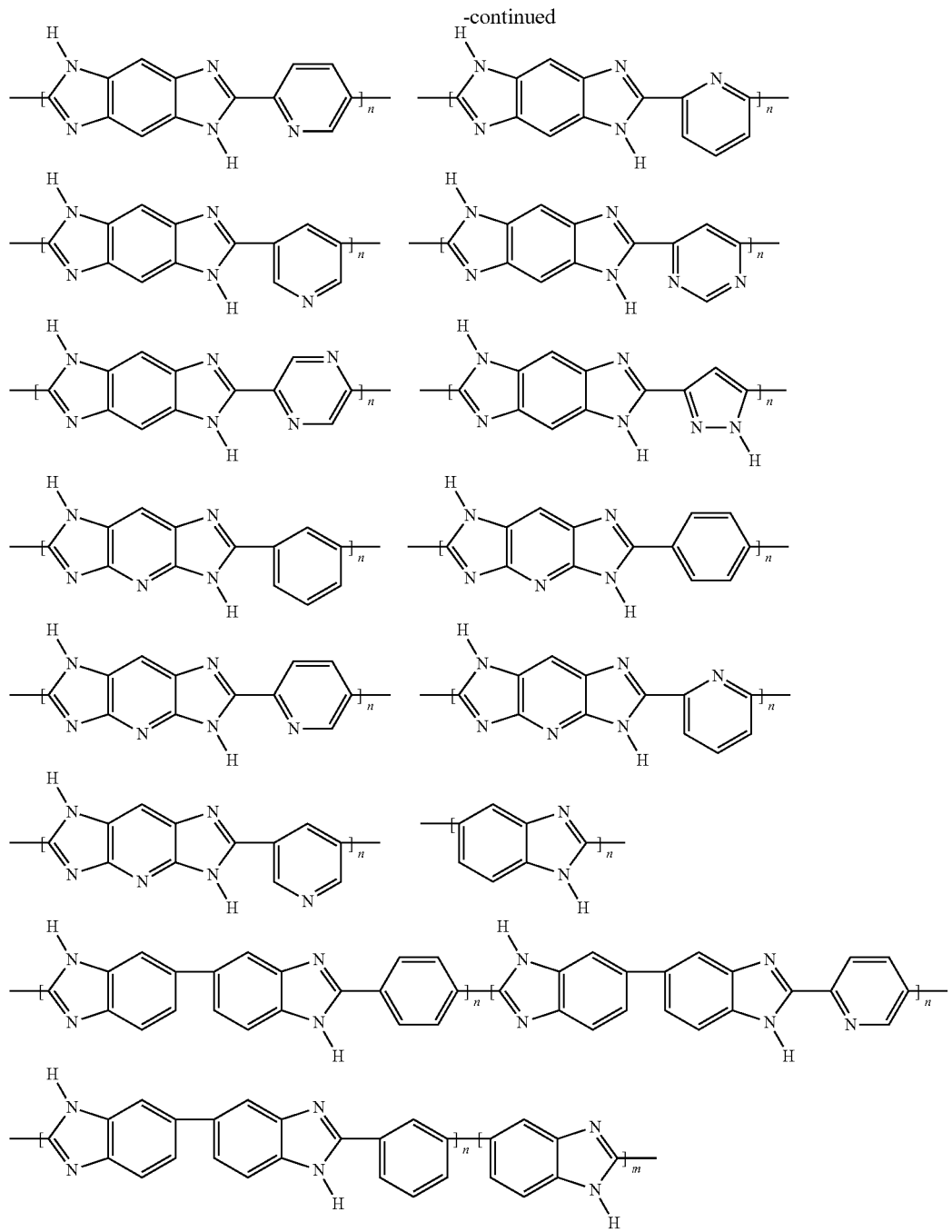

where n and m are integers ≥ 10, preferably ≥ 100.

With particular preference, the polyazole has repeating units of the following formula

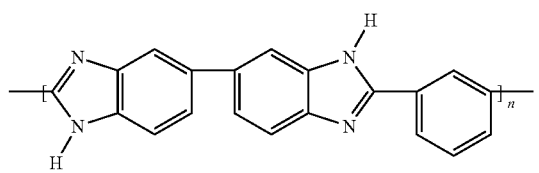

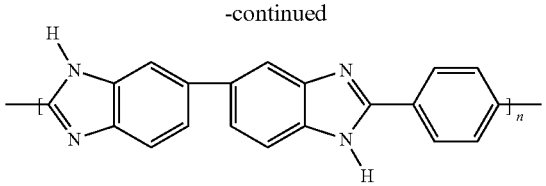

where n is an integer ≥ 10, preferably ≥ 100.

The polyazoles, preferably the polybenzimidazoles, are notable for a high molecular weight. Measured in the form of the intrinsic viscosity, the molecular weight is at least 0.2 dl/g, preferably 0.8 to 10 dl/g, more preferably 1 to 10 dl/g.

The viscosity eta i—also called intrinsic viscosity—is calculated from the relative viscosity eta rel in accordance with the following equation: eta i=(2.303×log eta rel)/concentration. The concentration here is expressed in g/100 ml. The relative viscosity of the polyazoles is determined by means of a capillary viscometer from the viscosity of the solution at 25° C., the relative viscosity being calculated from the corrected flow times for solvent t0 and solution t1 in accordance with the following equation eta rel=t1/t0. The conversion to eta i is made in accordance with the above-stated relationship on the basis of the details in "Methods in Carbohydrate Chemistry", Volume IV, Starch, Academic Press, New York and London, 1964, page 127.

Preferred polybenzimidazoles are available commercially, for example, under the trade name Celazol®PBI (from PBI Performance Products Inc.).

Catalytically Active Material

As catalytically active material it is possible to use all catalytically active materials typically employed in fuel cells. The catalytically active material preferably comprises a material selected from metals of the Pt group (Pt, Pd, Rh, Ir, Os, and Ru), silver, and gold. With particular preference the catalytically active material is selected from the group consisting of Pt, Pd, Rh, Ir, and Ru. These substances may also be used in the form of alloys with one another. Furthermore, these substances may also be used in alloy with base metals, preferably selected from Cr, Zr, Ni, Co, and Ti. With particular preference, Pt is used as catalytically active material.

The catalytically active materials are used preferably in the form of particles, which more preferably have a weight-average particle size of 0.5 to 100 nm, very preferably 0.75 to 20 nm, and with particular preference 1 to 10 nm, with the particle size referring to the average particle diameter.

The noble metal content of the catalyst material of the invention is generally 0.1 to 10 $mg/cm^2$, preferably 0.2 to 6.0 $mg/cm^2$, more preferably 0.2 to 3.0 $mg/cm^2$, following application of the catalyst material of the invention in the form of a catalyst layer. These values may be determined by elemental analysis on a flat sample.

In accordance with the invention, the catalyst material is prepared with the aid of the steps (i), (ii) and (iii) mentioned above.

(i) Contacting the at Least One Electrically Conductive Support Material with the at Least One Proton-Conducting, Polyazole-Based Polymer The contacting of the at least one electrically conductive support material with the at least one proton-conducting, polyazole-based polymer takes place generally in the presence of a solvent. The solvent in question is typically a solvent in which the at least one proton-conducting, polyazole-based polymer is soluble, whereas the at least electrically conducting support material is not soluble therein, but is instead present in the form of a suspension. Suitable solvents are, for example, selected from the group consisting of alcohols, e.g. methanol, ethanol, n-propanol, isopropanol, n-butanol, sec-butanol, tert-butanol, isobutanol, nitrogen-containing solvents, e.g. dimethylacetamide (DMAc), N-methylpyrrolidone (NMP), dimethylformamide (DMF), dimethyl sulfoxide (DMSO), and mixtures thereof or mixtures of one or more of the solvents mentioned above and water. As solvent it is particularly preferred to use nitrogen-containing solvents, with dimethylacetamide and N-methylpyrrolidone being especially preferred.

The weight ratio between the electrically conductive support material (in the dry state) and the proton-conducting polyazole-based polymer (likewise in the dry state) is generally 70:30 to 99:1, preferably 80:20 to 95:5.

The contacting in step (i) of the process of the invention may take place by any processes known to the skilled person. Typically, a solution of the at least one proton-conducting, polyazole-based polymer in at least one of the aforementioned solvents is mixed with the aforementioned electrically conductive support material. The mixing may take place in any apparatus known to the skilled person, as for example using a ball mill and/or under the action of ultrasound.

Step (i) of the process of the invention is carried out in general at temperatures 20 to 200° C., preferably 20 to 150° C., more preferably 20 to 100° C. Step (i) here may be carried out at any desired pressures, e.g., atmospheric pressure or increased pressure. Step (i) of the process of the invention is carried out preferably under atmospheric pressure.

It is possible for the solution or suspension of the electrically conductive support material and of the proton-conducting, polyazole-based polymer, obtained from step (i), to be used directly, without further processing, in step (ii) of the process of the invention. It is likewise possible, however, for the mixture obtained in step (i) to be freed completely or at least partly from solvent before step (ii) is carried out. In this case, the partial or complete removal of the solvent or solvent mixture may take place by any method known to the skilled person, as for example by removal of solvent at elevated temperature and/or under reduced pressure (a pressure below atmospheric pressure), in, for example, a rotary evaporator, a falling-film evaporator, or by spray drying.

Step (ii) Applying at Least One Precursor Compound of the at Least One Catalytically Active Material, or Applying the at Least One Catalytically Active Material Itself, to the Support Material Obtained from Step (I)

According to step (ii) of the process of the invention, the electrically conductive support material treated with the proton-conducting, polyazole-based polymer is admixed with a precursor compound of the at least one catalytically active material, or with the catalytically active material itself.

For this purpose, according to one embodiment of step (ii) of the process of the invention, a precursor compound of catalytically active material is mixed with the support material treated in accordance with step (i). Suitable mixing methods are known to the skilled person. Mixing takes place typically in the presence of a solvent. This may be—if the solvent has not been removed, or has been removed only partly, after step (i)—the same solvent used in step (i) of the process of the invention. If, however, the solvent has been removed completely in step (i) of the process of the invention, a different solvent or solvent mixture from that in step (i) may also be used for the mixing in step (ii).

In principle, in step (ii) of the process of the invention, the solvents that are suitable are the same solvents already stated above in respect of step (i) of the process of the invention.

The application of the precursor compound of the at least one catalytically active material takes place—as already mentioned above—in general by mixing of the at least one precursor compound of the at least one catalytically active material with the electrically conductive support material treated in accordance with step (i). This mixing may take place by any of the methods known to the skilled person, as for example by stirring and/or application of ultrasound, or the use of ball mills or dispersing machines, in accordance with the rotor/stator principle, for example.

Suitable precursor compounds of the at least one catalytically active material comprise at least one salt or complex of the metal of the at least one catalytically active material, suitable metals having already been stated above. It preferably comprises at least one halogen-free salt or at least one halogen-free complex, the at least one salt or the at least one complex being selected with particular preference from the group consisting of ammonium salts, nitrates, nitrosyl nitrates, nitrite complexes, amine complexes, and mixtures thereof. As a precursor compound of the at least one catalytically active material it is especially preferred to use Pt(II) nitrate.

The weight ratio of the precursor compound of the at least one catalytically active material to the electrically conductive support material used as support material in accordance with step (i) is arbitrary. Generally speaking, catalysts with 10-80% by weight noble metal loading on carbon are prepared.

According to a further embodiment, instead of at least one precursor compound of the at least one catalytically active material, the catalytically active material itself may be applied. In that case the abovementioned solvents and the abovementioned mixing methods can be used. The weight ratio of electrically conductive support material used in step (i) to catalytically active material is arbitrary. Generally speaking, catalysts with 10%-80% by weight noble metal loading on carbon are prepared.

The catalytically active material may be applied by any of the methods known to the skilled person, as for example by vapor deposition or electrochemical deposition.

Step (ii) of the process of the invention takes place in general at temperatures of 40 to 100° C., preferably 50 to 90° C., more preferably 60 to 85° C. Step (ii) may be carried out at any desired pressures, e.g., under atmospheric pressure or increased pressure. Step (ii) is carried out preferably under atmospheric pressure.

Following step (ii) of the process of the invention, the solvent preferably used may be removed completely or at least partly. It is in principle likewise possible, however, for the solvent-containing mixture obtained in step (ii) to be used directly in step (iii). Complete or partial removal of the solvent may take place by any method known to the skilled person, as for example at elevated temperature and/or under a pressure below atmospheric pressure, in, for example, a rotary evaporator, a falling film evaporator, or by spray drying.

Step (iii) Converting the at Least One Precursor Compound of the at Least One Catalytically Active Material into the Catalytically Active Material by Reduction Step (iii) of the process of the invention is employed only when in step (ii) at least one precursor compound of the at least one catalytically active material is employed. Where the catalytically active material itself is employed in step (ii), step (iii) is redundant.

The reduction in step (iii) may take place by any of the methods known to the skilled person. The reduction typically takes place electrochemically or chemically. The effect of the reduction is that the at least one catalytically active material is deposited on the electrically conductive support material treated in accordance with step (i) with at least one proton-conducting, polyazole-based polymer.

In one preferred embodiment, the reduction in step (iii) takes place by chemical reduction of the precursor compounds of the at least one catalytically active material. Where the precursor compounds of the at least one catalytically active material are present in the form of complexes, then, in one embodiment, in step (iii), prior to the reduction of the corresponding metal cations, there may be a dissociation of these complexes. Suitable methods and/or reagents are known to the skilled person.

Reducing agents which can be used in step (iii) of the process of the invention are in general all of the suitable reducing agents known to the skilled worker that are capable of converting the precursor compounds of the catalytically active material into the catalytically active material itself. Suitable reducing agents may be liquid or gaseous, for example.

If the solvent was not removed in step (ii) of the process of the invention prior to the reduction in step (iii) of the process of the invention, or was not removed completely (which is preferred), then in step (iii) of the process of the invention a reducing agent is used which is miscible with the solvents used in accordance with step (ii). As reducing agent it is preferred to use at least one alcohol. Ethanol, with particular preference, is used as a reducing agent. Further suitable reducing agents are, for example, hydrogen, $NaBH_4$, formic acid or formate.

In one preferred embodiment, step (iii) is carried out either by mixing the mixture obtained in step (ii) with at least one of the solvents already stated above in step (i), if the solvent has been removed completely in step (ii), or directly employing the mixture obtained in step (ii), in the solvent or solvent mixture employed in step (ii), and contacting the reducing agent, in gaseous form, in dispersion or in solution, with the precursor compound that is to be reduced.

The contacting here is accomplished generally by mixing. Suitable mixing methods are known to the skilled person.

Step (iii) of the process of the invention is carried out typically at temperatures of generally 40 to 100° C., preferably 50 to 90° C., more preferably 60 to 85° C. The pressure in step (iii) of the process of the invention is generally arbitrary; step (iii) is carried out preferably under atmospheric pressure or increased pressure, more preferably under atmospheric pressure.

The reducing agent is generally used in excess in relation to the precursor compound that is to be reduced.

Following step (iii) of the process of the invention, the solvent used in step (iii) is removed completely. The solvent may be removed by any of the methods known to the skilled person, as for example at elevated temperature and/or under a pressure below atmospheric pressure, in, for example, a rotary evaporator, a falling film evaporator or by spray drying. This gives the desired catalyst material.

If the catalytically active material itself is used in step (ii), step (iii) is redundant, and the material obtained after step (ii) is freed completely from the solvent used in step (ii).

Through the process of the invention, a catalyst material of the invention is obtained which is distinguished by the fact that the catalytically active material is readily accessible by the reactants and is not masked by the polyazole-based polymer. As a result, high activity of the catalytically active material is achieved. At the same time, however, as a result of the treatment of the support material with the proton-conducting, polyazole-based polymer, it is ensured that the acid used as dopant of the polyazole-based proton-conducting membrane, preferably sulfuric acid or phosphoric acid, most preferably phosphoric acid, is distributed homogeneously in the catalyst layer, and a loss of acid during cell operation is prevented or reduced.

In view of the sequence of the steps of the process of the invention, the catalyst material obtained in accordance with the process of the invention differs from the catalyst material obtained in accordance with the prior art in that the catalyst material comprising support material and catalytically active species is treated with a polyazole-based polymer.

The present invention accordingly further provides a catalyst material preparable by the process of the invention.

In comparison with the catalyst materials known from the prior art, this catalyst material has the advantage that the catalytically active area of the catalyst material is not covered with a polyazole-based proton-conducting polymer, and hence high catalytic activity of the catalyst material is ensured.

The catalyst material of the invention, or prepared in accordance with the invention, serves to form catalyst layers, more particularly catalyst layers in catalyst-coated membranes (CCMs), gas diffusion electrodes (GDEs) and/or membrane-electrode assemblies (MEAs).

In these systems, the catalyst layer is generally not self-supporting, but instead is typically applied to the gas diffusion layer (GDL) and/or to the proton-conducting polymer electrolyte membrane. In this case, a part of the catalyst layer may diffuse, for example, into the gas diffusion layer and/or into the membrane, thus forming transition layers. This may also result, for example, in the catalyst layer possibly being interpreted as part of the gas diffusion layer.

The thickness of the catalyst layer constructed from the catalyst material of the invention in a catalyst-coated membrane (CCM), gas diffusion electrode (GDE) or membrane-electrode assembly (MEA) is generally 1 to 1000 μm, preferably 5 to 500 μm, more preferably 10 to 300 μm. This FIGURE represents an average value determinable by measuring the layer thickness in the cross section of recordings obtainable using a light microscope or a thickness-measuring instrument.

The application of the catalyst material of the invention, or catalyst material prepared in accordance with the invention, to a polymer electrolyte membrane for the purpose of preparing a catalyst-coated membrane (CCM) or to a gas diffusion layer (GDL) for the purpose of preparing a gas diffusion electrode (GDE) may take place by any of the methods known to the skilled person. The catalyst material is typically applied by means of a catalyst ink which comprises at least one catalyst material of the invention and at least one solvent.

The present invention accordingly further provides a catalyst ink comprising at least one catalyst material of the invention or at least one catalyst material prepared in accordance with the invention and at least one solvent, the solvent preferably being selected from the group consisting of water, monohydric and polyhydric alcohols, N-containing solvents, glycols, glycol ether alcohols, and glycol ethers, more preferably selected from propylene glycol, dipropylene glycol, glycerol, ethylene glycol, hexylene glycol, dimethylacetamide (DMAc), N-methylpyrrolidone (NMP), and water.

Furthermore, the catalyst ink of the invention may comprise further additives. These may be wetting agents, flow control agents, defoamers, pore formers, stabilizers, rheological additives, pH modifiers, and other substances.

In general the catalyst ink of the invention comprises 1% to 30%, preferably 2% to 25%, more preferably 5% to 20%, by weight of the catalyst material of the invention, or of the catalyst material prepared in accordance with the invention, and 70% to 99%, preferably 75% to 98%, more preferably 80% to 95%, by weight, of the at least one solvent. The total amount of catalyst material and solvent makes 100% by weight.

The additives are used, based on the total amount of the catalyst material, in general in an amount of 0.5 to 15 parts by weight, preferably 0.5 to 12.5 parts by weight, more preferably 0.5 to 10 parts by weight.

The at least one catalyst material is generally in dispersion in the at least one solvent in the catalyst ink of the invention.

The catalyst ink is prepared generally by contacting the at least one catalyst material with the at least one solvent and, where used, the additives referred to above.

The present invention further relates to the use of the catalyst material of the invention for preparing a catalyst ink comprising at least one catalyst material and at least one solvent. Suitable catalyst materials and solvents, and also, optionally, suitable additives, have already been specified above.

The present invention further provides for the use of the catalyst ink of the invention for producing a catalyst-coated membrane (CCM), a gas diffusion electrode (GDE) or a membrane-electrode assembly (MEA), the aforementioned catalyst-coated membranes, gas diffusion electrodes, and membrane-electrode assemblies being employed preferably in polymer electrolyte fuel cells or in PEM electrolysis.

For producing a catalyst-coated membrane (CCM), a gas diffusion electrode (GDE) or a membrane-electrode assembly (MEA), the catalyst ink is applied generally in homogeneously dispersed form to the ion-conducting polymer electrolyte membrane of the catalyst-coated membrane (CCM) or to the gas diffusion layer (GDL) of a gas diffusion electrode. A homogeneously dispersed ink can be prepared by means known to the skilled person, as for example by means of high-speed stirrers, ultrasound or ball mills.

Application of the homogeneously dispersed catalyst ink to the polymer electrolyte membrane or to the gas diffusion layer may take place by various techniques known to the skilled person. Suitable techniques are, for example, printing, spraying, knife coating, rolling, brushing and spreading.

Generally speaking, the resulting catalyst layer comprising the catalyst material of the invention or produced by applying the catalyst ink of the invention is dried following application. Suitable drying methods are known to the skilled person. Examples are hot-air drying, infrared drying, microwave drying, plasma methods, and combinations of these methods.

The present invention further provides a catalyst-coated membrane (CCM) comprising a polymer electrolyte membrane which has a top face and a bottom face, there being applied both on the top face and on the bottom face a catalytically active layer comprising at least one catalyst material of the invention or at least one catalyst material prepared by the process of the invention.

Suitable polymer electrolyte membranes of the catalyst-coated membrane are known in principle to the skilled person. Particularly suitable are proton-conducting polymer electrolyte membranes on a polyazole basis. Suitable polyazole polymers for preparing the membranes in question are the proton-conducting, polyazole-based polymers specified above in respect of the catalyst material. These polymer electrolyte membranes are rendered proton-conducting generally by addition of an acid, such as sulfuric acid or phosphoric acid, for example, more preferably phosphoric acid.

The polymer electrolyte membranes are prepared generally by methods known to the skilled person, as for example by casting, spraying or knife-coating of a solution or dispersion comprising the components used for preparing the polymer electrolyte membrane to a carrier. Carriers that are suitable are all typical carrier materials known to the skilled person, examples being polymeric films such as polyethylene terephthalate (PET) films or polyethersulfone films, or metal ribbon, it being possible for the membrane to be detached subsequently from the carrier material.

The polymer electrolyte membrane used in the catalyst-coated membranes (CCMs) of the invention generally has a layer thickness of 20 to 2000 μm, preferably 30 to 1500 μm, more preferably 50 to 1000 μm.

The present invention further provides a gas diffusion electrode (GDE) comprising a gas diffusion layer (GDL) and a catalytically active layer comprising at least one catalyst material of the invention or catalyst material prepared in accordance with the invention.

As gas diffusion layers it is usual to use sheetlike structures which are electrically conducting and acid-resistant. These structures include, for example, graphite fiber papers, carbon fiber papers, woven graphite sheets and/or graphite papers, which are made conductive by addition of carbon black. The effect of these layers is to produce a fine distribution of the gas streams or liquid streams.

Furthermore, it is also possible to use gas diffusion layers which comprise a mechanically stable support material impregnated with at least one electrically conductive material, e.g., carbon (carbon black, for example). Support materials particularly suitable for these purposes comprise fibers, in the form for example of nonwovens, papers or wovens, more particularly carbon fibers, glass fibers or fibers comprising organic polymers, as for example propylene, polyesters (polyethylene terephthalate), polyphenylene sulfide or polyether ketones. Further details of such diffusion layers may be found in WO 97/20358, for example.

The gas diffusion layers preferably have a thickness in the range from 80 μm to 2000 μm, more preferably 100 μm to 1000 μm, very preferably 150 μm to 500 μm.

Moreover, the gas diffusion layers advantageously possess a high porosity. This porosity is situated preferably in the range from 20% to 80%.

The gas diffusion layers may comprise customary additives. These include, among others, fluoropolymers, such as polytetrafluoroethylene (PTFE), for example, and surface-active substances.

In one embodiment, the gas diffusion layer may be constructed from a compressible material. For the purposes of the present invention, a compressible material is characterized by the property whereby the gas diffusion layer can be pressed by pressure to at least half, preferably to at least a third, of its original thickness without loss of its integrity. This property is possessed in general by gas diffusion layers comprising woven graphite sheet and/or paper which has been made conductive by addition of carbon black.

The catalytically active layer in the gas diffusion electrode of the invention comprises the catalyst material of the invention and/or the catalyst material prepared in accordance with the invention.

The catalytically active layer is typically applied to the gas diffusion electrode using the aforementioned catalyst ink of the invention. In this case, the method for applying the catalyst ink to the gas diffusion electrode corresponds to the method for applying the catalyst ink to the catalyst-coated membrane, which has been described comprehensively above.

The present invention additionally provides a membrane-electrode assembly comprising a polymer electrolyte membrane which has a top face and a bottom face, there being applied both on the top face and on the bottom face a catalytically active layer comprising at least one catalyst material in accordance with the invention or catalyst material prepared in accordance with the invention, with a gas diffusion layer being applied on each catalytically active layer.

Suitable polymer electrolyte membranes are the polymer electrolyte membranes specified above in respect of the catalyst-coated membrane. Suitable gas diffusion layers are the gas diffusion layers specified above in respect of the gas diffusion electrode of the invention.

The production of the membrane-electrode assemblies of the invention is known in principle to the skilled person. Typically, the various constituents of the membrane-electrode assembly are placed one above another and are joined to one another by pressure and temperature, with lamination taking place typically at a temperature of 10 to 300° C., preferably 20 to 200° C., and under a pressure of in general 1 to 1000 bar, preferably 3 to 300 bar.

One advantage of the membrane-electrode assemblies of the invention, in accordance with the present invention, is that they allow a fuel cell to be operated at temperatures above 120° C. This is true for gaseous and liquid fuels such as hydrogen-containing gases which are prepared, for example, in an upstream reforming step from hydrocarbons. As oxidant in this case it is possible to use oxygen or air, for example.

A further advantage of the membrane-electrode assemblies of the invention is that in operation above 120° C. even with pure platinum catalysts, i.e., without a further alloying constituent, they exhibit a high tolerance toward carbon monoxide. At temperatures of 160° C., for example, more than 1% of carbon monoxide may be present in the combustion gas, without this leading to a marked reduction in the performance of the fuel cell.

Furthermore, a key advantage of the membrane-electrode assemblies of the invention is that, as a result of the use of the catalyst material of the invention in the catalytically active layer of the membrane-electrode assembly, an increase is achieved in the three-phase boundaries; good and homogeneous distribution of acid in the catalyst layer is achieved; a reduction or prevention of loss of acid during cell operation is achieved; and an increased long-term stability is achieved. This is achieved, owing to the order in the process of the invention for preparing the catalyst material of the invention, by, inter alia, firstly treating the electrically conductive support material of the catalyst material with the proton-conducting polyazole-based polymer and only then applying the active component. In this way, covering of the catalytically active area with the proton-conducting polyazole-based polymer is avoided and the activity is increased compared to catalyst materials prepared by other processes.

The membrane-electrode assemblies of the invention can be operated in fuel cells with no need for wetting of the combustion gases or the oxidants, in spite of the high possible operating temperatures. The fuel cell nevertheless operates stably, and the membrane does not lose its conductivity. This simplifies the overall fuel cell system and brings additional cost savings, since the water circulation regime is simplified. Moreover, it also improves the process at temperatures below 0° C. of the fuel cell system.

The membrane-electrode assemblies of the invention make it possible, furthermore, for the fuel cell to be cooled without problems to room temperature or below and thereafter to be put back into operation with no loss of performance.

Furthermore, the membrane-electrode assemblies in accordance with the present invention exhibit—as already mentioned above—a high long-term stability. As a result, fuel cells can be provided which likewise exhibit a long-term stability. Moreover, the membrane-electrode assemblies of the invention exhibit outstanding temperature resistance and corrosion resistance, and a comparatively low gas permeability, particularly at high temperatures. A decrease in mechanical stability and in structural integrity, especially at high temperatures, is reduced or prevented in the membrane-electrode assemblies of the invention.

Moreover, the membrane-electrode assemblies of the invention can be produced easily and inexpensively.

The present invention further provides a fuel cell comprising at least one membrane-electrode assembly of the invention. Suitable fuel cells and their components are known to the skilled person.

Since the power produced by a single fuel cell is often too low for many applications, a plurality of fuel cells are preferably combined via separator plates to form a fuel cell stack for the purposes of the present invention. Here, the separator plates should, optionally together with further sealing materials, seal the shape of the cathode and the anode from the outside and between the gas spaces of the cathode and the anode. For this purpose, the separator plates are preferably juxtaposed so as to form a seal with the membrane-electrode assembly. The sealing effect can be increased further by pressing the composite of separator plates and membrane-electrode assembly.

The separator plates preferably each have at least one gas channel for reaction gases which are advantageously arranged on the sides facing the electrodes. The gas channels should allow distribution of the reactant fluids.

In view of the high long-term stability of the membrane-electrode assemblies in accordance with the present invention, the fuel cell of the invention also has a high long-term stability. The fuel cell of the invention can be operated continuously over long periods of time, typically, more than 5000 hours, for example, at temperatures of more than 120° C., using dry reaction gases, with no marked performance degradation being observable. The power densities achievable in this case are high even after such a long time.

Here, the fuel cells of the invention display, even after a long time, for example more than 5000 hours, a high open-circuit voltage which after this time is preferably at least 900 mV. To measure the open-circuit voltage, the fuel cell is operated without producing a current and with hydrogen being supplied to the anode and air being supplied to the cathode. The measurement is carried out by switching the fuel cell from a current of 0.2 A/cm² to the zero-current state and then recording the open-circuit voltage for 5 minutes. The value after 5 minutes is the corresponding open-circuit potential. The measured values for the open-circuit voltage are at a temperature of 160° C. Furthermore, the fuel cell preferably displays a low gas crossover after this time. To measure the crossover, the anode side of the fuel cell is operated using hydrogen (5 l/h) and the cathode is operated using nitrogen (5 l/h). The anode serves as reference electrode and counterelectrode and the cathode serves as working electrode. The cathode is placed at a potential of 0.5 V and the hydrogen diffusing through the membrane is oxidized at the cathode in a mass-transfer-limited manner.

The resulting current is a measure of the hydrogen permeation rate. The current is <3 mA/cm², preferably <2 mA/cm², particularly preferably <1 mA/cm², in a 50 cm² cell. The measured values of the $H_2$ crossover are at a temperature of 160° C.

The present invention additionally provides for the use of the catalyst material of the invention and of the catalyst material prepared in accordance with the invention for preparing the catalytically active layers of a membrane-electrode assembly.

The invention claimed is:

1. A process of preparing a catalyst material, the process comprising:
    contacting an electrically conductive support material with a proton-conducting polyazole-based polymer that is not a membrane, and thereafter
    applying a precursor compound of a catalytically active material suitable for a fuel cell or applying a catalytically active material suitable for a fuel cell itself to the support material, and
    if a precursor compound of the catalytically active material is applied, converting the precursor compound into the catalytically active material by reduction,
    thereby obtaining a catalyst material comprising the electrically conductive support material, the proton-conducting polyazole-based polymer, and the catalytically active material,
    wherein the catalytically active material is not masked by the polyazole-based polymer.

2. The process according to claim 1, wherein the electrically conductive support material is a carbon-comprising support material.

3. The process according to claim 1, wherein the proton-conducting, polyazole-based polymer is based on a polyazole which comprises repeating azole units of formula (I), formula (II), or both

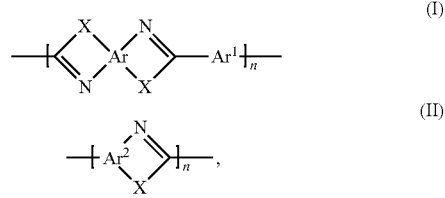

each Ar is independently a tetravalent, mono- or polycyclic, aromatic or heteroaromatic group,
each $Ar^1$ is independently a divalent, mono- or polycyclic, aromatic or heteroaromatic group,
each $Ar^2$ is independently a divalent or trivalent, mono- or polycyclic, aromatic or heteroaromatic group,
each X is independently oxygen, sulfur, or an amino group that comprises a hydrogen atom or a group having 1 to 20 carbon atoms, as further radical, and
n is an integer greater than or equal to 10.

4. The process according to claim 1, wherein the catalytically active material is a metal of the Pt group, silver, gold, an alloy of two or more thereof, or an alloy thereof with a base metal.

5. The process according to claim 1, wherein the contacting is in the presence of a solvent.

6. The process according to claim 5, further comprising:
    partly or completely removing the solvent before applying the precursor or catalytically active material.

7. The process according to claim 1, wherein the applying comprises applying, as a precursor compound, a salt or complex of a metal of the catalytically active material.

8. The process according to claim 1, wherein applying the precursor compound or the catalytically active material is in the presence of a solvent.

9. The process according to claim 8, further comprising:
    partly or completely removing the solvent after applying the precursor compound or the catalytically active material.

10. The process according to claim 1, wherein the reduction is electrochemical or chemical reduction.

11. A catalyst material, obtained by the process according to claim 1, wherein the catalytically active material is not masked by the polyazole-based polymer.

12. A catalyst ink comprising the catalyst material according to claim 11 and a solvent.

13. A catalyst-coated membrane, comprising:
    a polymer electrolyte membrane that comprises a top face and a bottom face, and
    a catalytically active layer comprising the catalyst material according to claim 11 both on the top face and on the bottom face.

14. A gas diffusion electrode, comprising:
a gas diffusion layer and
a catalytically active layer comprising the catalyst material according to claim 11.

15. A membrane-electrode assembly, comprising:
a polymer electrolyte membrane that comprises a top face and a bottom face,
a catalytically active layer comprising the catalyst material according to claim 11 both on the top face and on the bottom face, and
a gas diffusion layer on each catalytically active layer.

16. The process of claim 3, wherein the polyazole-based polymer is based on a polyazole comprising a repeating unit of formula (I).

17. The process of claim 3, wherein the polyazole-based polymer is based on a polyazole comprising a repeating unit of formula (II).

18. The process of claim 3, wherein n is at least 100.

19. The process of claim 1, wherein the catalytically active material comprises at least one selected from the group consisting of Pt, Pd, Rh, Ir, and Ru.

20. The process of claim 1, wherein the electrically conductive support material is contacted with a solution of the proton-conducting polyazole-based polymer.

* * * * *